May 6, 1969 E. L. KILBOURN 3,442,443
PRESSURE PUMP WITH GAUGE
Filed Dec. 27, 1966
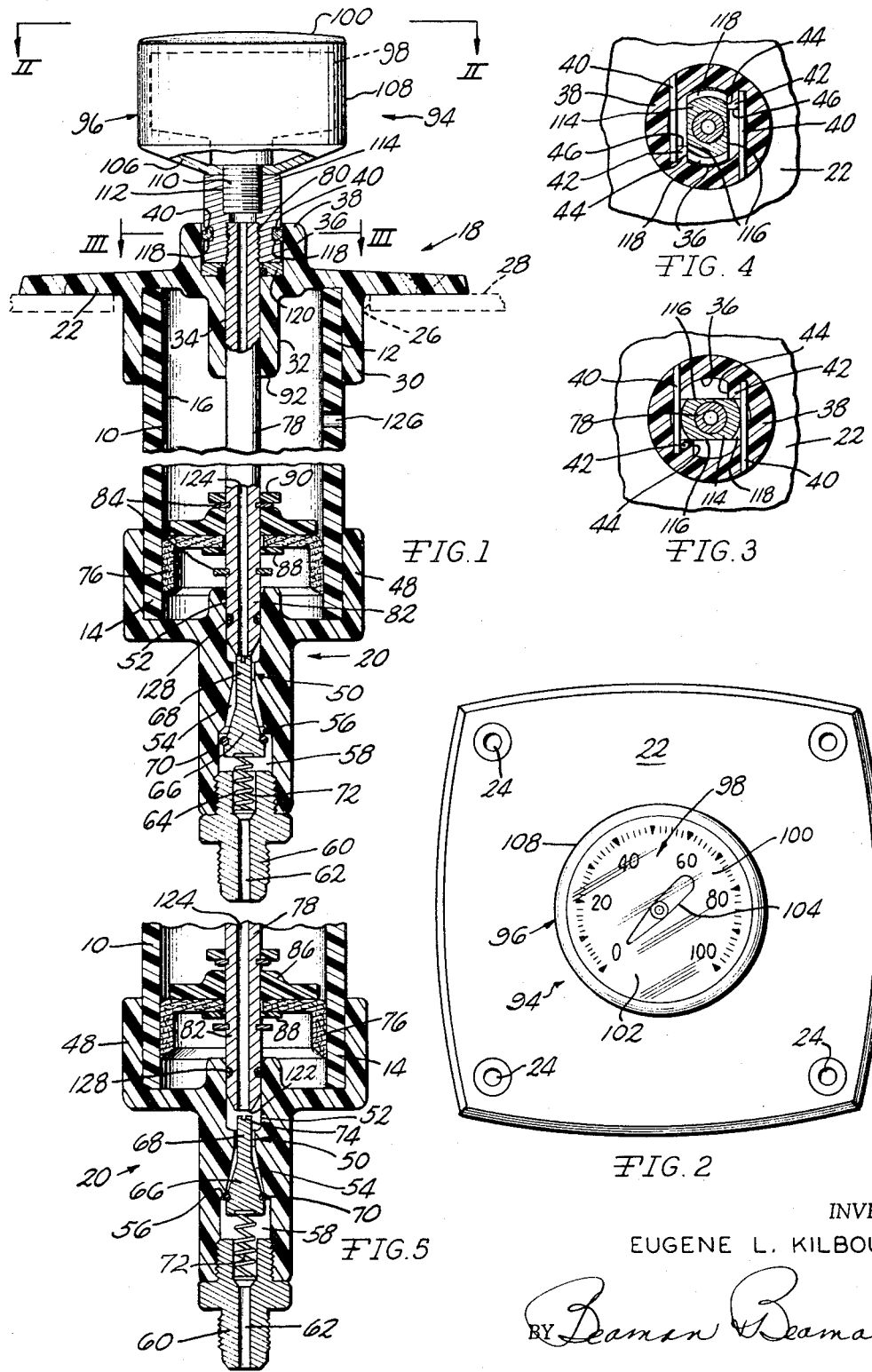
INVENTOR
EUGENE L. KILBOURN
BY Beaman Beaman
ATTORNEYS

United States Patent Office 3,442,443
Patented May 6, 1969

3,442,443
PRESSURE PUMP WITH GAUGE
Eugene L. Kilbourn, Marshall, Mich., assignor to Progressive Dynamics, Inc., Marshall, Mich.
Filed Dec. 27, 1966, Ser. No. 604,852
Int. Cl. F04b *39/00;* B65d *83/00;* G01m *3/32*
U.S. Cl. 230—172        8 Claims

ABSTRACT OF THE DISCLOSURE

A manually operated pump for pressurizing water systems, or for use in similar applications, wherein the pump handle comprises a gauge, and check valve means are incorporated into the pump permitting a reading of the pressure created even while the pump piston rod is locked in an inactive position.

---

Manually operated pumps are often used to pressurize vessels, such as liquid supply tanks, in order to dispense liquids from the tanks. Such pumps normally pump air and are either built into the vessel or tank to be pressurized, or communicate therewith through suitable conduits. It is common to use a manually operated pump with the water systems employed in house trailers, travel trailers, truck-supported campers, boats, and other mobile housing facilities. With this type of installation air is pumped into the water storage tank to place the system under pressure whereby water will be forced from the tank when a tap is opened.

Due to the mobile nature of boats and camping equipment, water is often supplied to the water tank through a nonpressurized source, such as by bucket, and the entire pressurization of the water system must be manually accomplished. To assure adequate pressure within the water system and indicate the condition of the system, it is desirable that a pressure indicator be included in the system. Such indicator normally takes the form of a pressure gauge wherein the pressure within the water system may be directly read from a dial. For convenience of reading and access, it is desirable to place the gauge within the mobile housing apparatus and, likewise, the pressurizing pump is normally located within the housing apparatus. To mount the gauge adjacent the pump, a conduit must extend from the gauge to the tank, or a pressurized conduit of the system and, thus, the separate installation of a pressure gauge in the normal manner is relatively expensive from an installation standpoint.

It is an object of the invention to provide a manually operated pressure pump which incorporates a pressure-indicating gauge within the pump structure whereby installation of the pump into the pressurized system simultaneously provides gauging means for the system.

An additional object of the invention is to provide a manually operated pump utilizing a pressure gauge therewith wherein the pump incorporates check valve means to prevent back pressure upon the movable pump components during return of the pump piston, yet means are provided for establishing commuincation between the gauge and pressurized system when the pump is not in operation.

Another object of the invention is to provide a manually operated pressure pump utilizing a gauge incorporated therewith wherein the gauge is mounted in the handle of the pump whereby the exterior appearance of the pump includes the presence of the gauge.

A further object of the invention is to provide a manually operated pump having an operating knob which comprises the casing for a pressure-indicating gauge.

An additional object of the invention is to provide a manually operated pressure pump having a piston rod capable of being locked in a predetermined position and wherein a pressure gauge associated with the pump indicates pressure within the pressurized system upon the piston rod being locked in the predetermined position.

Another object of the invention is to provide a manually operated pump incorporating a pressure gauge in the handle thereof wherein the pump is formed of low cost components, and wherein the pump is capable of trouble-free operation requiring little maintenance.

These and other objects of the invention arising from the relationship and construction of details of components of an embodiment thereof will be apparent from the following description and accompanying drawings wherein:

FIG. 1 is an elevational, diametrical, sectional view of a pressure pump in accord with the invention, illustrating the piston rod in the locked, pressure reading position, FIG. 2 is a plan view of the pressure pump as taken along section II—II of FIG. 1, FIG. 3 is an enlarged, detail, sectional view taken along section III—III of FIG. 1 through the piston rod retaining apparatus, FIG. 4 is an enlarged, sectional, detail view similar to FIG. 3, illustrating the relationship of the piston rod retaining components upon rotating the piston rod 90° with respect to FIG. 3, and FIG. 5 is a detail, diametrical, elevational view of the outlet portion of the pump of the invention, illustrating the check valve in the closed position.

A manually operated pump in accord with the invention includes a cylinder body 10, FIG. 1, which is of a cylindrical configuration having an upper end portion 12 and a lower end portion 14 and defining a cylinder 16. The end portion 12 of the cylinder body is enclosed by a head 18, and the body end portion 14 is enclosed by a head 20. Preferably, in the interest of cleanliness, weight, economy and ease of manufacture, the body 10 and heads 18 and 20 are formed of a molded, synthetic plastic material. For instance, the cylinder body and the head 18 may be formed of ABS plastic, while the head 20 may be formed of the synthetic material commonly known as Delrin, or ABS.

The head 18 includes a substantially planar mounting plate portion 22 having four screw-receiving holes 24 defined therein, FIG. 2, whereby the head and, thus, the pump, may be mounted within a hole 26 defined in a counter top, wall, bulkhead, or other supporting surface, as represented by the dotted lines 28, FIG. 1. A cylindrical flange 30 extends from the plate 22 and is of a diameter to receive end portion 12 of the cylinder body 10 whereby the head 18 may be firmly attached to the body by a bonding agent such as epoxy cement. The central portion of the head 18 includes an inwardly extending projection 32 having a cylindrical opening or bore 34 defined therein which is coaxial with the cylinder 16. The opening 34 extends completely through the head 18 communicating with an enlarged socket 36 defined in the projecting portion 38 of the head. The socket 36 is formed in the annular portion 38 coaxial with the opening 34. A pair of piston rod retaining pins 40 are mounted within the portion 38 extending into the socket 36, as will be apparent in FIGS. 3 and 4. The socket also includes abutment members 42 adjacent the pins 40 each of which includes surfaces 44 and 46 for a purpose which will later be described. It will be noted the pins 40 are located on opposite sides of the center of the socket 36 and equidistant therefrom.

The head 20 includes a cup-shaped portion 48 adapted to receive the cylinder body end portion 14 whereby the head may be bonded to the cylinder body and encloses the associated end thereof. The head 20 includes a passage 50 extending through the head coaxial with the axis of the cylinder 16. The passage 50 includes a cylindrical portion 52 disposed adjacent the cylinder. The portion 54 constitutes a check valve receiving portion wherein a check valve seat is defined by the conical surface 56. The portion 58 of the passage 50 is of an enlarged diametrical dimension and is threaded adjacent the end of the fitting to receive a bushing 60. The bushing 60 is provided with a conduit passage 62 extending therethrough and is also formed with a spring-receiving depression 64 which is disposed toward a check valve 66 located within the passage portion 54.

The check valve 66 is of a configuration which will be apparent from FIGS. 1 and 5, including a neck 68 which extends into the cylindrical passage portion 52 when the valve O-ring 70 seats upon the seat 56 under the biasing influence of the spring 72, FIG. 5. The end of the neck of the check valve 66 disposed toward the cylinder is diametrically slotted at 74. The spring 72 will maintain the check valve in a seated arrangement, as shown in FIG. 5.

A conduit, such as a pipe, copper tubing, hose or the like is affixed to the fitting bushing 60 and is in communication with the system or tank to be pressurized whereby air pumped by the pump passes into the pressurized system.

A cup-shaped piston 76 is slightly mounted within the cylinder 16 and is adapted to sealingly associate therewith. The piston may be formed of leather and forms a flap valve at its periphery in a conventional manner to permit air to pass around the piston on the nonpressurizing stroke of the pump.

The piston 76 is operated by a cylindrical piston rod 78, preferably formed of metal, having an outer end which is threaded at 80 and is exterior of the cylinder, and an inner end 82 within the cylinder. The piston 76 is mounted on the piston rod inner end with a central clearance by means of a pair of axially spaced snap rings 84 received within annular grooves defined on the piston rod. A nylon backup washer 86 supports and reinforces the radially extending portion of the piston and a synthetic, plastic seal 88 is disposed upon the opposite side of the piston in sealed relation to the piston rod. The piston is capable of a limited axial movement on the piston rod as restricted by the snap rings 84 which permits air flow through the piston central bore on the back stroke and seal 88 seals the piston bore on the pressure stroke.

A neoprene washer 90 is preferably mounted between the lower end 92 of the inwardly extending head projection 32 and the upper snap ring 84 to cushion engagement of the piston structure with the head 18 if the operator withdraws the piston rod its maximum extent within the cylinder 16.

A handle 94 is affixed to the outer end of the piston rod 78 and, preferably, is in the form of a pressure gauge casing 96. The casing 96 houses a pressure gauge 98 and the outermost face 100 of the casing is transparent to permit viewing of the pressure gauge indicia face 102, FIG. 2, and the pressure-indicating needle 104. For purposes of appearance, it is desirable that while the lower portion 106 of the casing 96 may be of metal, the wall portion 108 and the transparent face 100 may be formed of plastic which has a high resistance to impact, fracturing and breakage.

The gauge 98 includes a threaded fitting 110 which is threaded into the bore 112 of a metal sleeve 114. The sleeve 114 is generally of a cylindrical configuration having a diameter less than the diameter of the socket 36. However, the portion of the sleeve which is adapted to be received within the socket 36 is provided with a pair of parallel flats 116, FIGS. 3 and 4, and a pair of grooves 118 are defined in the sleeve circumference intersecting the flats. The grooves are of an axial width slightly greater than the diameter of the pins 40, and the distance separating the flats is slightly less than the distance separating the abutment surfaces 44. A cushioning washer 120 is located in the lower end of the socket 36 and includes a sealing ring which engages the piston rod.

The inner end 82 of the piston rod 78 is of a diameter as to be closely received within the passage cylindrical portion 52, and is tapered at the end surface 122 to guide the piston rod end 82 into the portion 52 when the piston rod is extended its maximum degree into the cylinder body. The piston rod inner end is of sufficient length to engage and displace the check valve 66 from its seat when the grooves 118 are in alignment with the pins 40, as in FIG. 1.

The piston rod 78 is provided with a passage or conduit 124 extending the axial length thereof for providing communication between the gauge 98 and the inner end 82 of the piston rod. Due to the check valve slot 74, pressurized fluid adjacent the end surface 122 of the piston rod may enter the conduit 124 and, thus, permit the pressure to be registered by the gauge.

Operation of the pump in accord with the invention is as follows:

To permit pressurizing of the system with which the pump is associated by means of the conduit, not shown, attached to the bushing 60, the operator rotates the handle 94 90° from the position shown in FIGS. 1 and 3 to the position of FIG. 4. In this position, the sleeve grooves 118 are removed from engagement with the pins 40 and the operator is able to reciprocate the piston rod 78 back and forth to pump air into the system. The cylinder body 10 is provided with an opening 126 whereby air is drawn into the cylinder during the pressurizing stroke and will pass around the piston 76 during a nonpressurizing stroke whereby the pump will operate in the well-known manner. Normally, during pumping the piston rod will not be moved to its extreme locations wherein the washer 90 would engage the surface 92, or the piston rod end 122 would engage the check valve neck 68. During pumping the check valve 66 will prevent the pressurized air from returning from the system into the cylinder during the nonpressurizing stroke.

When it is desired to read the gauge to determine the pressure within the vessel being pressurized, or is it desired to cease pumping, the piston rod is depressed its maximum extent into the cylinder body with the sleeve 114 related to the pins 40, as shown in FIG. 4. Thus, the sleeve 114 will engage the washer 120 and the operator will turn the handle and sleeve in a counterclockwise direction 90° whereby the flats 116 on the sleeve will engage the abutment surfaces 46 and the pins 40 will be received within the grooves 118. Thus, the piston rod and piston assembly will be restrained against axial movement, and the handle 94 will be located adjacent the mounting plate 22, as in FIG. 1.

When the piston rod is in the locked position, the end 122 of the piston rod will be engaging and displacing the check valve 66 from its seat 56 and pressurized air will enter the passage portion 54 and pass through the slot 74 into the conduit 124 to permit the gauge 98 to indicate the pressure within the pressurized vessel or system. Thus, during the entire time the pump is in the inoperative position and not being used, the pressure on the pressurized system will be indicated by the gauge.

Air cannot escape between the piston rod end 82 and the cylindrical portion 52 due to the sealing ring 128 and, thus, it will be appreciated that when the pump is in the condition shown in FIG. 1, the pressurized system remains sealed, even through the check valve 66 is unseated.

By combining the gauge with the pump structure, it is only necessary to install the pump in order to also provide pressure indication. No separate installation is required for a pressure gauge. As in the preferred embodiment, wherein the casing for the pressure gauge actually constitutes the handle for the piston rod, a simplified structure is produced which results in an attractive appearance occupying a minimum of space. As the purpose of the pump of the invention is to pressurize the system, the incorporation of the pump and gauge into a common unit produces the advantages set forth above, while preventing excessive costs or requiring complex manufacturing techniques.

It is appreciated that various modifications to the inventive concept may be apparent to those skilled in the art without departing from the spirit and scope thereof, and it is intended that the invention be defined only by the scope of the following claims.

I claim:

1. A manually operated pump comprising, in combination, a cylinder body having a first end and a second end and defining a cylinder, an outlet passage defined in said cylinder body first end in communication with said cylinder adjacent said first end and adapted to communicate with a pressure storage vessel, a piston rod receiving opening defined in said cylinder body second end, a piston reciprocally mounted within said cylinder, an elongated piston rod connected to said piston forming an assembly therewith and extending through said opening, a handle mounted on said piston rod exterior of said cylinder body, a check valve mounted in said outlet passage permitting fluid to flow from said cylinder through said passage, spring means biasing said check valve toward a closed position, check valve operating means carried by said piston rod and piston assembly adapted to engage and unseat said check valve at a predetermined position of said piston rod and piston within said cylinder, a pressure gauge, and a conduit having one end communicating with said gauge and the other end communicating with said passage adjacent said check valve upon said piston rod and piston being located at said predetermined position to permit said gauge to indicate the pressure within the pressurized vessel.

2. In a pump as in claim 2 wherein said gauge is mounted on said handle and said conduit is defined in said piston rod.

3. In a pump as in claim 1 wherein said check valve operating means comprises an axially extending extension defined on said piston rod having an end adapted to engage said check valve upon said piston rod and piston being located at a predetermined axial position within said cylinder.

4. In a pump as in claim 3 wherein piston rod retaining means are defined on said cylinder body second end and locking means are defined on said handle cooperating with said retaining means restraining said piston rod against axial displacement upon said piston rod and piston assembly being located at said predetermined position.

5. A manually operated pump comprising, in combination, a cylinder body having first and second ends and defining a cylinder, a piston rod opening defined in said second end, an elongated piston rod slidably received within said opening having an inner end located within said cylinder and an outer end disposed exteriorly of said cylinder, a piston within said cylinder mounted upon said piston rod, a handle mounted on said piston rod outer end, an outlet passage defined in said cylinder body first end communicating with said cylinder and in axial alignment with said piston rod inner end, a check valve within said passage adapted to seal said passage against the flow of fluid through said passage into said cylinder, spring means biasing said check valve toward a closed condition, an extension portion defined on said piston rod inner end adapted to engage and displace said check valve from its seat upon said piston rod being fully axially displaced into said cylinder, a pressure gauge mounted on said handle, and a conduit defined in said piston rod establishing communication between said gauge and said passage while said check valve is displaced from its seat by said extension portion.

6. In a pump as in claim 5 wherein piston rod retaining means are defined on said cylinder body second end and locking means are defined on said handle adapted to cooperate with said retaining means to restrain said piston rod against axial movement while said check valve is being displaced by said piston rod extension.

7. A manually operated pump comprising, in combination, a cylindrical body having a first end and a second end and defining a cylinder, an outlet passage defined in said body adjacent said first end, a piston slidably received within said cylinder, a piston rod connected to said piston and slidably extending through said body second end, a pressure gauge having a knob-like casing including an axis, a cylindrical outer casing wall concentric to said axis and a transparent window transversely disposed to said axis, a gauge inlet fitting extending from said casing on the opposite side thereof with respect to said window and concentric to said axis, means connecting said fitting to said piston rod exteriorly of said cylindrical body whereby said gauge casing constitutes a knob-like handle for said piston rod, and a conduit defined in said piston rod in communication with said gauge inlet fitting and communicating with said outlet passage.

8. In a manually operated pump as in claim 7 wherein said casing wall and window are formed of a synthetic plastic material and said casing wall is of a significantly larger diameter than said piston rod.

References Cited

UNITED STATES PATENTS

| 1,197,832 | 9/1916 | Le May | 230—172 |
| 1,403,685 | 1/1922 | Hammett | 230—172 |
| 1,486,498 | 3/1924 | Smith | 230—172 |
| 1,593,383 | 7/1926 | Brown | 222—402 |
| 2,077,572 | 4/1937 | Lofgren | 55—274 |
| 2,293,675 | 8/1942 | Martin | 230—172 |
| 2,576,687 | 11/1951 | Krehbiel | 230—172 |
| 3,006,282 | 10/1961 | Sisson | 230—172 |

FOREIGN PATENTS 24,586   1897   Great Britain.

HENRY F. RADUAZO, Primary Examiner.

U.S. Cl. X.R.

73—47; 222—401